(12) United States Patent
Taniguchi et al.

(10) Patent No.: US 7,370,975 B2
(45) Date of Patent: May 13, 2008

(54) IMAGE PROCESSING APPARATUS

(75) Inventors: Fuminori Taniguchi, Shioya-gun (JP); Nobuharu Nagaoka, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 11/287,751

(22) Filed: Nov. 28, 2005

(65) Prior Publication Data

US 2006/0114272 A1 Jun. 1, 2006

(30) Foreign Application Priority Data

Nov. 30, 2004 (JP) ............................. 2004-347821

(51) Int. Cl.
*G03B 21/00* (2006.01)
*G03B 13/18* (2006.01)
*H04N 5/225* (2006.01)
*G06K 9/00* (2006.01)
*G03C 5/18* (2006.01)

(52) U.S. Cl. .......................... 353/69; 353/122; 396/69; 396/96; 348/148; 348/169; 382/103; 382/107; 382/219; 430/435

(58) Field of Classification Search ................. 396/69, 396/96; 348/143, 148, 169; 382/218, 219, 382/103, 107; 353/69, 70, 121, 122; 430/435
See application file for complete search history.

(56) References Cited

U.S. PATENT DOCUMENTS 6,404,455 B1 * 6/2002 Ito et al. ..................... 348/169

6,891,563 B2 * 5/2005 Schofield et al. ........... 348/148

FOREIGN PATENT DOCUMENTS

| JP | 8-313632 | 11/1996 |
|---|---|---|
| JP | 11-328364 | 11/1999 |
| JP | 2000-030197 | 1/2000 |
| JP | 2001-6096 | 1/2001 |
| JP | 2001-211449 | 8/2001 |
| JP | 2001-351200 | 12/2001 |
| JP | 2003-216937 | 7/2003 |

* cited by examiner

*Primary Examiner*—Melissa Jan Koval
(74) *Attorney, Agent, or Firm*—Carrier, Blackman & Associates, P.C.; Joseph P. Carrier; William D. Blackman

(57) ABSTRACT

An image processing apparatus which includes: an imaging device; a reference luminance property storage device that stores a predetermined reference luminance property; a luminance property calculating device that calculates a luminance property of the imaging device from an image obtained by the imaging device; a comparing device that compares the reference luminance property and the luminance property; a displacement determining device that determines whether or not the luminance property has relative displacement with respect to the reference luminance property based on a comparison result of the comparing device; and a luminance property correcting device that corrects the luminance property, wherein, when the luminance property is determined by the displacement determining device to have relative displacement with respect to the reference luminance property, the luminance property correcting device corrects the luminance property so as to become equivalent to the reference luminance property.

3 Claims, 6 Drawing Sheets

IMAGE PROCESSING APPARATUS

BACKGROUND OF THE INVENTION

1. Field of the Invention

The present invention relates to an image processing apparatus that processes an image taken by an imaging apparatus that can capture for example in the visible light region or infrared region.

Priority is claimed on Japanese Patent Application No. 2004-347821, filed Nov. 30, 2004, the content of which is incorporated herein by reference.

2. Description of Related Art

There is conventionally known a vehicle surroundings monitoring apparatus in which an object such as a pedestrian with a possibility of colliding with a vehicle is extracted from an infrared image of an automobile's surroundings captured by an infrared camera, and information of this object is provided to the driver (for example, see Japanese Unexamined Patent Application, First Publication No. 2001-6096).

In the vehicle surroundings monitoring apparatus according to one example of the aforementioned prior art, the infrared camera that outputs an image and the processing apparatus that processes the image output from the infrared camera are set to perform image formation and image processing in accordance with a predetermined preset value that serves as an ideal reference for the image luminance value. However, differences in the luminance value setting can arise for the image output from the infrared camera and the image actually processed by the processing apparatus. This is due for example to individual differences occurring in the luminance value setting of each infrared camera when mounting the plurality of infrared cameras on a vehicle, the luminance value setting changing in accordance with aging of the infrared cameras, and the image signal output from the infrared camera attenuating or distorting in the process of being sent to the processing apparatus. For this reason, it is desirable to set the reference luminance value setting equally for the image output from an infrared camera and the image actually processed by a processing apparatus.

SUMMARY OF THE INVENTION

The present invention was made in view of the above-mentioned circumstances, and has as its object providing an image processing apparatus capable of easily setting equally the reference luminance value setting for the image output from an infrared camera and the image actually processed by a processing apparatus.

In order to attain the object that solves the above-mentioned problem, the present invention provides an image processing apparatus including: an imaging device; a reference luminance property storage device that stores a predetermined reference luminance property; a luminance property calculating device that calculates the luminance property of the imaging device from an image obtained by the imaging device; a comparing device that compares the reference luminance property stored in the reference luminance property storage device and the luminance property calculated by the luminance property calculating device; a displacement determining device that determines whether or not the luminance property of the imaging device has relative displacement with respect to the reference luminance property based on a comparison result of the comparing device; and a luminance property correcting device that makes a correction of the luminance property of the imaging device, wherein, when the luminance property of the imaging device is determined by the displacement determining device to have relative displacement with respect to the reference luminance property, the luminance property correcting device corrects the luminance property of the imaging device so as to become equivalent to the reference luminance property.

When there is relative displacement between a predetermined reference luminance property stored in advance and a luminance property calculated from an image, the aforementioned image processing device corrects the luminance property of the imaging device so that the luminance property of the imaging device becomes equivalent to a predetermined reference luminance property, and so performs appropriate image processing.

The image processing apparatus of the present invention may further include: a correction possibility determining device that determines whether or not it is possible to correct the luminance property of the imaging device by the luminance property correcting device based on a determination result by the displacement determining device; and an informing device that outputs an alarm when the correction is determined by the correction possibility determining device to be impossible.

By outputting an alarm when it is determined that the correction is impossible, such as when the amount of correction to the luminance property exceeds a predetermined amount, the driver of the vehicle can be made to appropriately recognize the reliability of the image processing.

DETAILED DESCRIPTION OF THE INVENTION

Hereunder, an image processing apparatus according to one embodiment of the present invention is described with reference to the drawings.

Figure 1:
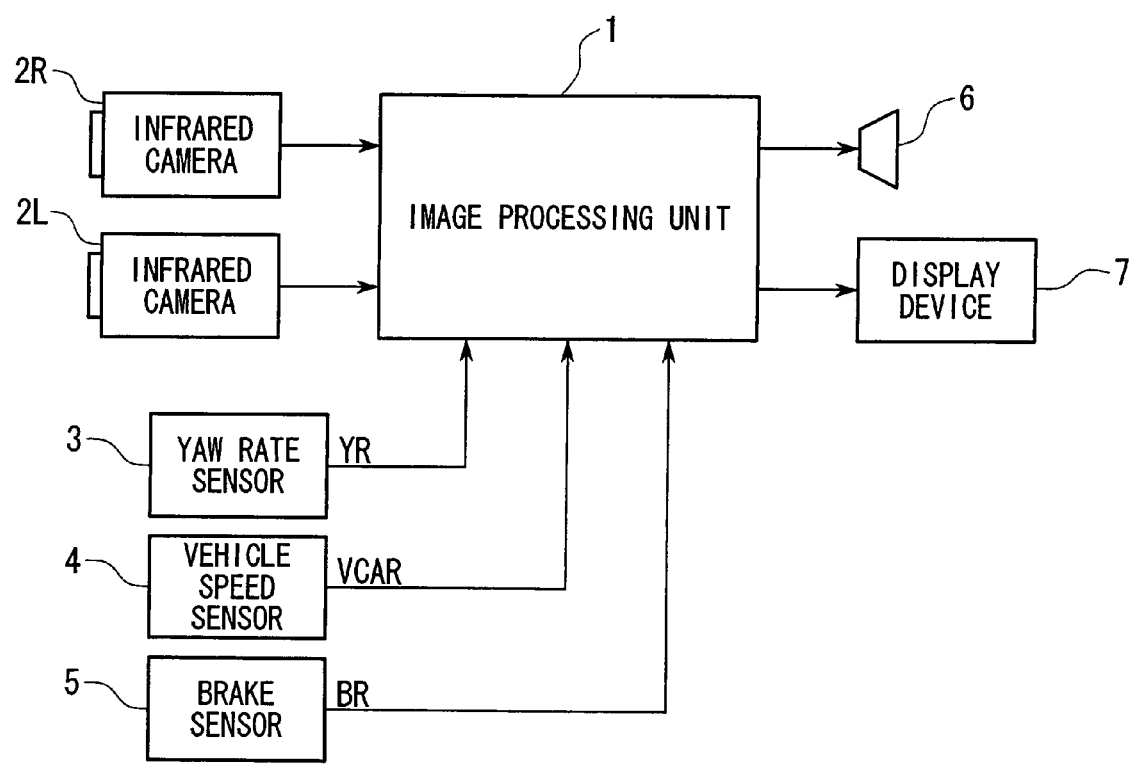
FIG. 1 is a block diagram showing the constitution of the image processing apparatus according to an embodiment of the present invention.

The image processing apparatus according to the present embodiment, for example as shown in FIG. 1, constitutes an image processing unit 1 provided in a vehicle surroundings monitoring apparatus, this vehicle surrounding monitoring apparatus including: an image processing unit 1 equipped with a CPU (Central Processing Unit) that controls the image processing apparatus; two infrared cameras 2R and 2L that are capable of detecting distant infrared radiation; a yaw rate sensor 3 that detects the yaw rate of the vehicle; a vehicle speed sensor 4 that measures the traveling speed of the vehicle; a brake sensor 5 that detects a driver's braking operation; a loudspeaker 6; and a display device 7. For example, the image processing unit 1 detects a moving object such as a pedestrian or an animal in front of the vehicle in its traveling direction from infrared images of the vehicle surroundings that are captured by the two infrared cameras 2R and 2L, and from detection signals relating to the traveling status of the vehicle that are detected by each of the sensors 3, 4, and 5. In the case where the possibility of a collision between the detected moving object and the vehicle is determined, a warning is output via the loudspeaker 6 or the display device 7.

Moreover, the display device 7 is, for example, constructed including a display device integrated with gauges that display various traveling states of the vehicle, a display device such as a navigation device, and furthermore an HUD (Head Up Display) 7a that displays various information at a position on the front window where the field of front vision of the driver is not impaired.

In addition, the image processing unit 1 includes an A/D converter, that converts input analog signals to digital signals, an image memory that stores digitized image signals (luminance values), a CPU (central processing unit) that performs various arithmetic processing, a RAM (Random Access Memory) that is used for storing data in the middle of the arithmetic processing, a ROM (Read Only Memory) that stores programs that are performed by the CPU and tables, maps and the like, and an output circuit that outputs drive signals for the loudspeaker 6 and display signals for the HUD 7a. The image-processing unit 1 is constructed such that the output signals of the infrared cameras 2R and 2L, and the respective sensors, 3, 4, and 5 are input into the CPU after being converted to digital signals.

Figure 2:
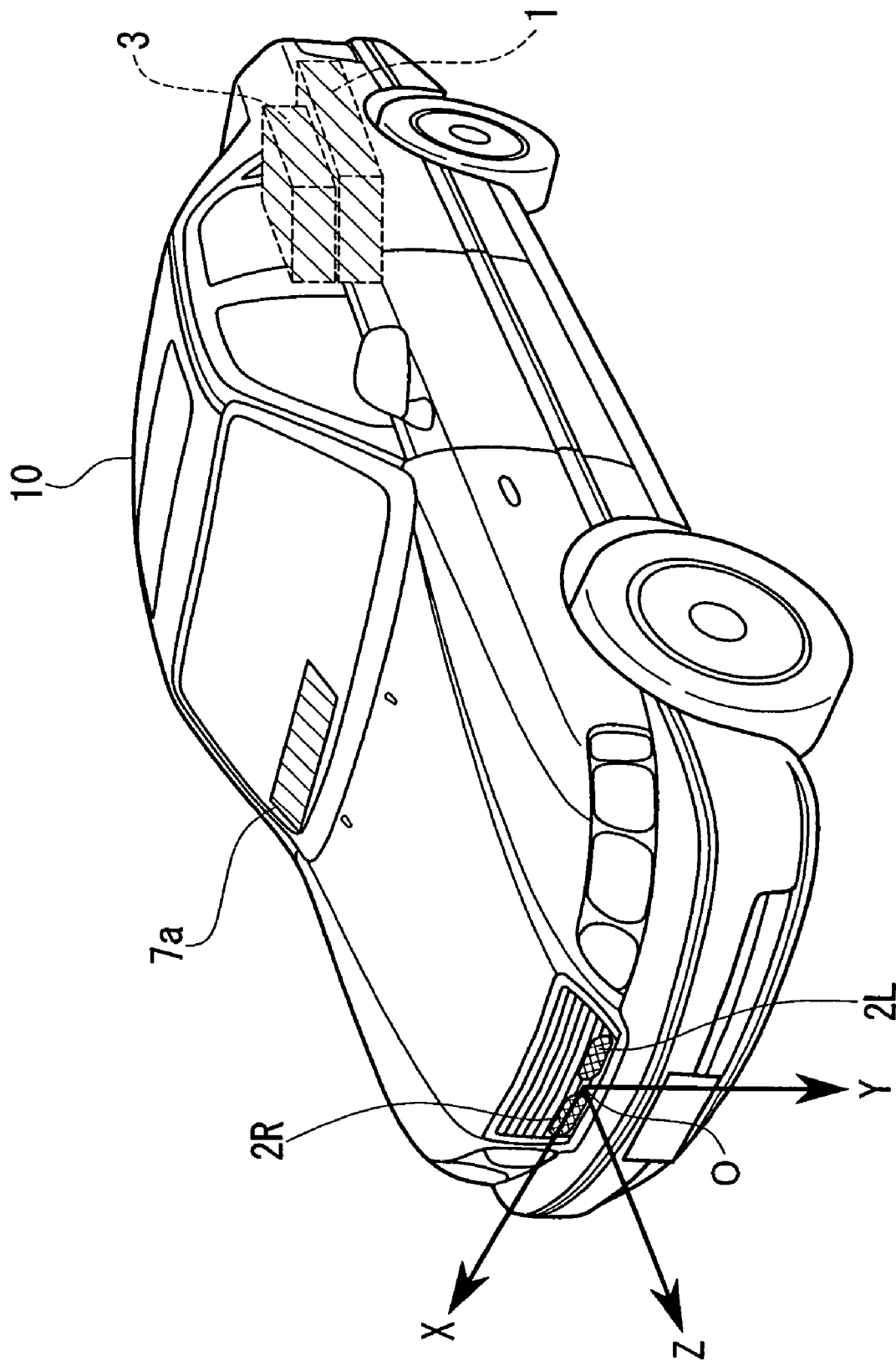
FIG. 2 is a diagram showing a vehicle equipped with the image processing apparatus shown in FIG. 1.

Furthermore, as shown in FIG. 2, two infrared cameras 2R and 2L are disposed at the front of the vehicle 10 at positions symmetrical in the width direction relative to the central axis of the vehicle 10. The optical axes of both cameras 2R and 2L are parallel to each other, and both infrared cameras 2R and 2L are secured at the same height from the road surface. A characteristic of the infrared cameras 2R and 2L is that the output signal level (that is, luminance) increases as the temperature of the object increases.

Moreover, the HUD 7a is provided so as to display the images at a position on the front window of the vehicle 10, where the field of front vision of the driver is not impaired.

Figure 3:
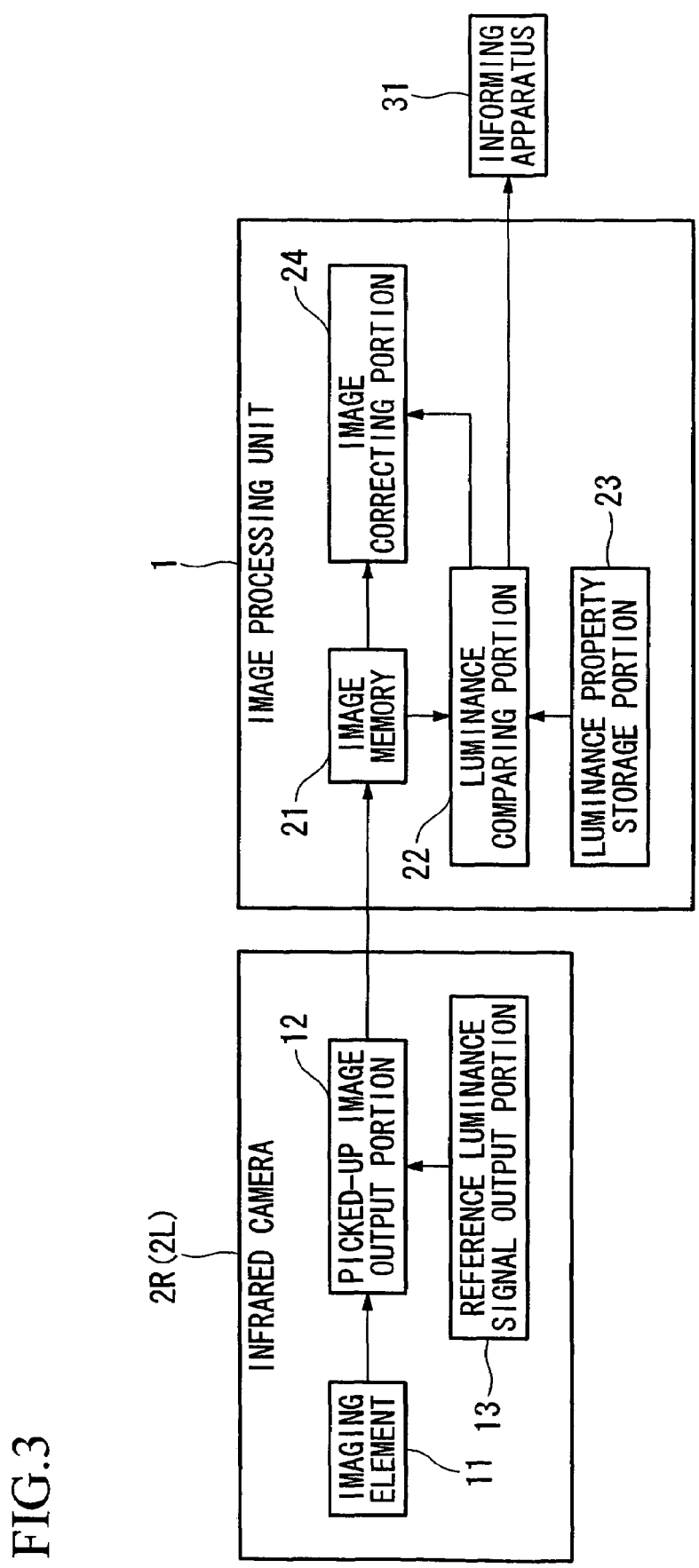
FIG. 3 is a lineblock diagram of the image processing unit shown in FIG. 1.

As shown for example in FIG. 3, the infrared cameras 2R and 2L each include a CCD or CMOS imaging element 11, a picked-up image output portion 12, and a reference luminance signal output portion 13.

The picked-up image output portion 12 outputs an infrared image obtained by image pick-up of the imaging element 11 to the image processing unit 1 together with a predetermined reference luminance signal output from the reference luminance signal output portion 13.

Figure 4:
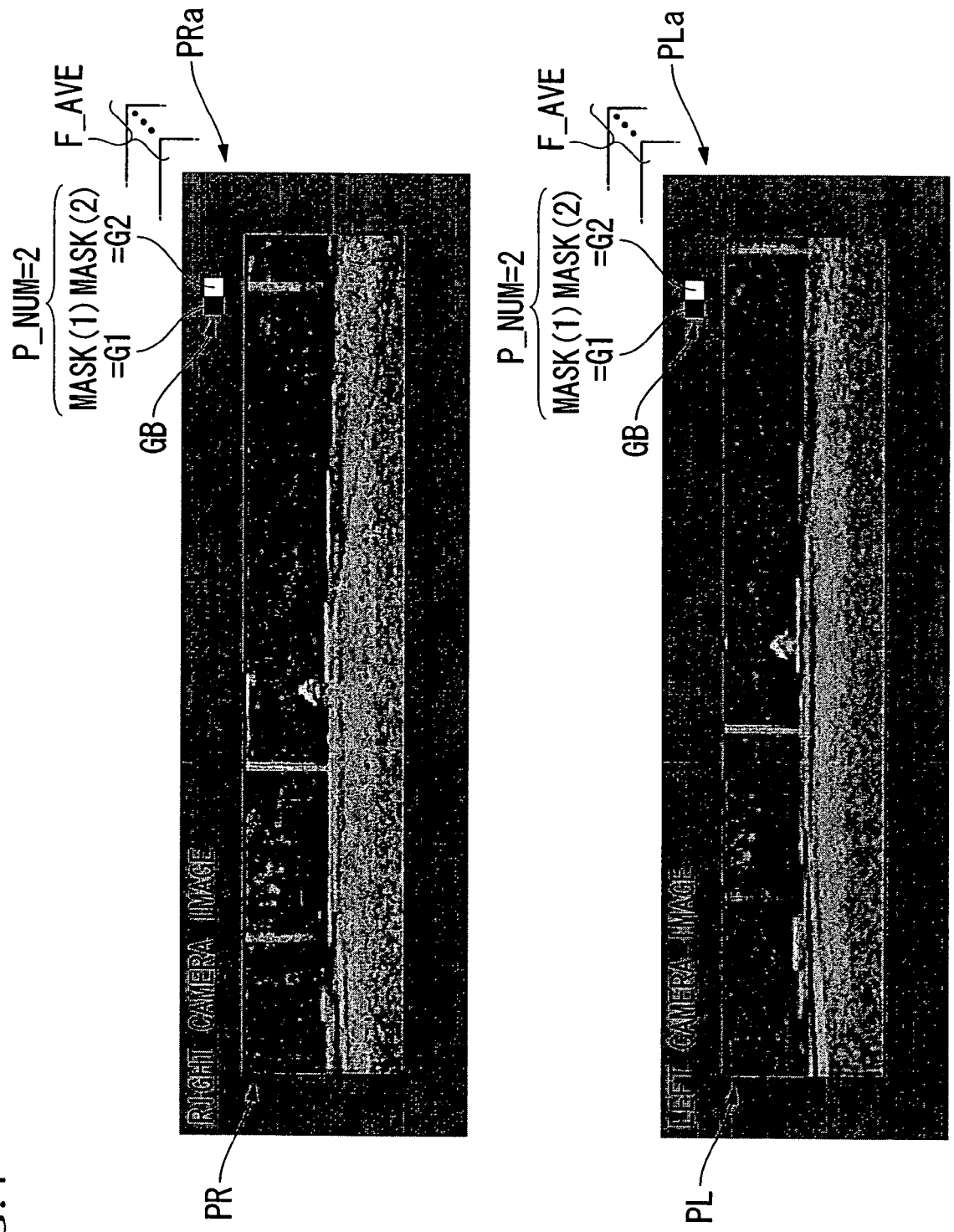
FIG. 4 is a diagram showing an example of infrared images output from each infrared camera, and a grayscale bar as a reference luminance signal.

Here, as shown for example in FIG. 4, the data output to the image processing unit 1 includes the infrared images PR and PL of the infrared cameras 2R and 2L, respectively, and the grayscale bar GB disposed on the infrared images PR and PL at a predetermined position in the regions PRa and PLa outside the angle-of-view region of the infrared cameras 2R and 2L as the predetermined reference luminance signal. This grayscale bar GB for example includes each pattern of a predetermined reference minimum luminance G1 and a reference maximum luminance G2.

As shown for example in FIG. 3, the image processing unit 1 includes an image memory 21, a luminance comparing portion 22, a luminance property storage portion 23, and an image correcting portion 24, and in particular an informing apparatus 31 equipped with a loudspeaker 6 and a display apparatus 7 is connected to the luminance comparing portion 22 of the image processing unit 1.

In this image processing unit 1, the image memory 21 stores the infrared image and the reference luminance signal received from the infrared camera 2R (or 2L) as digital data.

The luminance comparing portion 22 compares the reference luminance signal stored in the image memory 21 together with the infrared image and a predetermined luminance property stored in advance in the luminance property storage portion 23, and outputs a comparison result to the image correcting portion 24 and the informing apparatus 31.

For example, the luminance comparing portion 22 sets a luminance gain R_GAIN and L_GAIN and a luminance level R_LEVEL and L_LEVEL by the method of least squares etc. in the evaluation formula for each infrared camera 2R and 2L shown in the numerical expression (1) below so that a luminance MASK (J) of each pattern becomes equal to a predetermined luminance property KID (J), based on a pattern number P_NUM constituting the grayscale bar GB (for example, P_NUM=2), an appropriate frame number F_AVE (for example, F_AVE=30), the luminance MASK (J) of each pattern constituting the grayscale bar GB that is a predetermined reference luminance signal (J is an appropriate nonnegative integer, J=1, . . . , P_NUM), the luminance gain R_GAIN and L_GAIN and the luminance level R_LEVEL and L_LEVEL for each infrared camera 2R and 2L, and the predetermined luminance property KID (J) stored in advance in the luminance property storage portion 23 in accordance with each pattern constituting the grayscale bar GB.

Here, when either one of the evaluation values Err_R and Err_L is not less than a predetermined threshold value Err_TH (for example, Err_TH=50), excessive correction is required for the infrared image output from the infrared camera 2R and 2L, and so the corresponding infrared camera 2R and 2L is determined to be in an abnormal state. As an alarm informing this abnormal state, an audible warning such as an alarm sound or alarm voice via the loudspeaker 6 or a visual warning such as a display via the display apparatus 7 is output from the informing apparatus 31, and correction processing by the image correcting portion 24 is prohibited.

$$\mathrm{Err\_R} = \frac{1}{\mathrm{P\_NUM} \times \mathrm{F\_AVE}} \times \sum_J \{\mathrm{R\_GAIN} \times MASK(J) + \mathrm{R\_LEVEL} - KID(J)\}^2 \quad (1)$$

$$\mathrm{Err\_L} = \frac{1}{\mathrm{P\_NUM} \times \mathrm{F\_AVE}} \times \sum_J \{\mathrm{L\_GAIN} \times MASK(J) + \mathrm{L\_LEVEL} - KID(J)\}^2$$

The image correcting portion 24 corrects (changes to the right and left process image luminance) the luminance of the infrared image (right and left image input luminance) stored in the image memory 21 by, for example, numerical expression (2) below in accordance with the luminance gain R_GAIN and L_GAIN and the luminance level R_LEVEL and L_LEVEL set by the luminance comparing portion 22.

right process image luminance=R_GAIN×right camera image input luminance+R_LEVEL left process image luminance=L_GAIN×left camera image input luminance+L_LEVEL  (2)

After correction by the image correcting portion 24, when the difference between the luminance of adjacent patterns MASK (J) and MASK (J+1) is not more than a predetermined threshold, the reliability of the infrared image by the correction is determined to have fallen. As an alarm informing this state, an audible warning such as an alarm sound or alarm voice via the loudspeaker 6 or a visual warning such as a display via the display apparatus 7 is output from the informing apparatus 31, and predetermined object recognition processing for the corrected infrared image is prohibited.

The image processing apparatus according to the present embodiment is provided with the construction described above. Next, the operation of the image processing apparatus is described with reference to the drawings.

Figure 5:
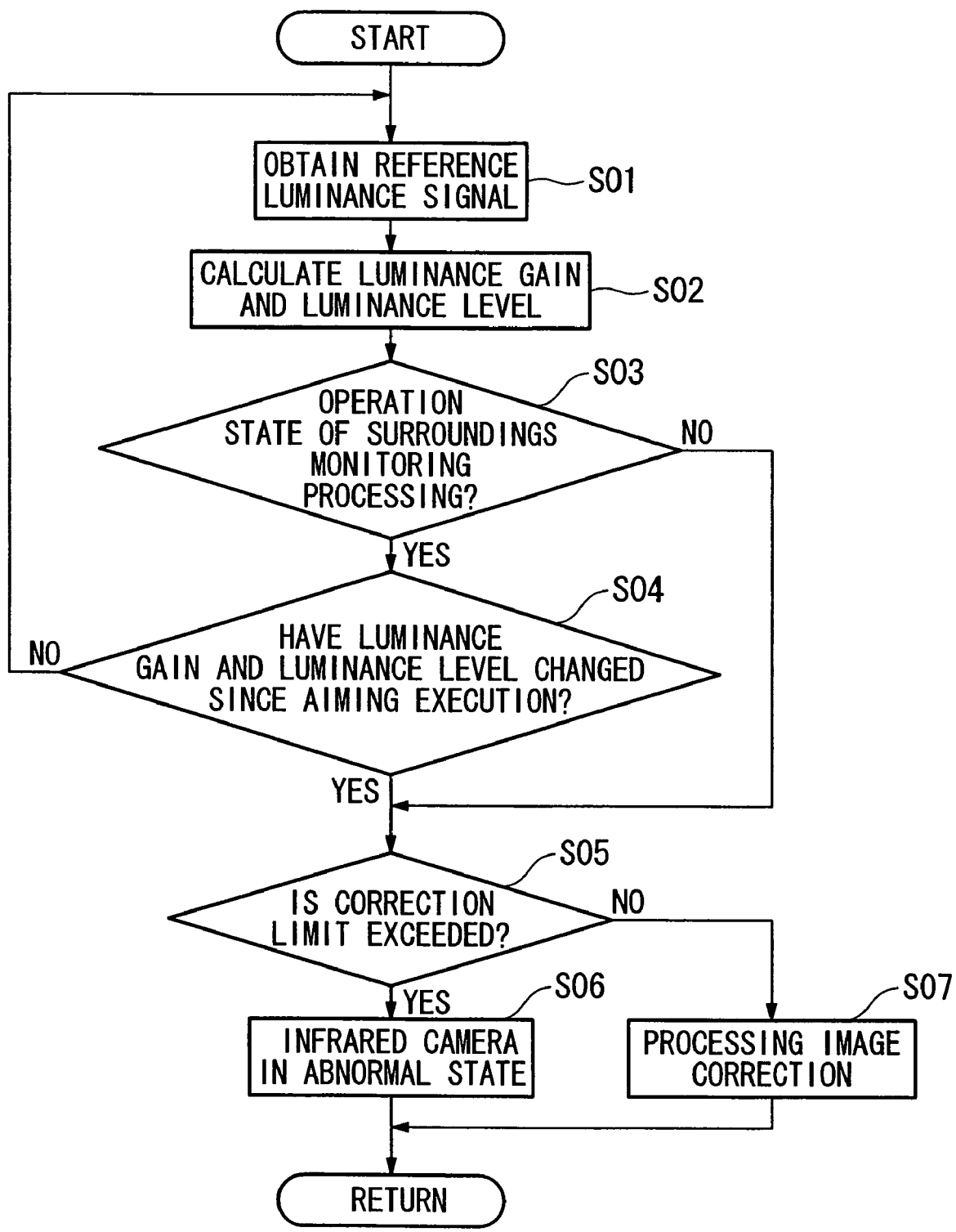
FIG. 5 is a flowchart showing the operation of the image processing unit shown in FIG. 1, particularly the process of controlling the electrical power supply for an infrared camera.

First of all, in step S01 shown in FIG. 5, an infrared image and a predetermined reference luminance signal are obtained from the infrared camera 2R and 2L.

Next, in step S02, the luminance gain R_GAIN and L_GAIN and luminance level R_LEVEL and L_LEVEL are set by the method of least squares etc. in the evaluation formula for each infrared camera 2R and 2L shown in the numerical expression (1) above so that a luminance MASK (J) of each pattern becomes equal to a predetermined luminance property KID (J).

Next, in step S03, it is determined whether or not it is in the operation state of the surroundings monitoring processing based on the infrared image output from the infrared camera 2R and 2L.

When the determination result is "NO", that is, in the event of a non-operation state of the surroundings monitoring processing and during execution of aiming that adjusts the processing content of the image processing, the flow proceeds to step S05 that is described later.

On the other hand, when the determination result is "YES", the flow proceeds to step S04.

In step S04, it is determined whether or not the luminance gain R_GAIN, L_GAIN and luminance level R_LEVEL, L_LEVEL have changed from the values during aiming.

When this determination result is "NO", the flow returns to step S01.

On the other hand, when the determination result is "YES", the flow proceeds to step S05.

In step S05, it is determined for example whether or not either one of the evaluation values Err_R and Err_L shown for example in numerical expression (1) above is not less than a predetermined threshold value Err_TH (for example, Err_TH=50), and therefore that the correction limit has been exceeded.

When the determination result is "YES", the flow proceeds to step S06, and in step S06, it is determined that the corresponding infrared camera 2R, 2L is in an abnormal state, and the processing is terminated.

On the other hand, when the determination result is "NO", the flow proceeds to step S07, and in this step S07, in accordance with the set luminance gain R_GAIN, L_GAIN and luminance level R_LEVEL, L_LEVEL, the luminance of the infrared image (right and left image input luminance) stored in the image memory 21 is corrected (changed to the right and left process image luminance) for example by the numerical expression (2) above, and the processing is terminated.

As described above, when there is relative displacement between a predetermined reference luminance property stored in advance and a reference luminance signal, the image processing apparatus of the present embodiment corrects the reference luminance signal of the infrared camera 2R and 2L so that the reference luminance signal of the infrared camera 2R and 2L becomes equivalent to the predetermined luminance property, and so performs appropriate image processing.

Moreover, when it is determined that either one of the evaluation values Err_R and Err_L shown in numerical expression (1) above is not less than a predetermined threshold value Err_TH (for example, Err_TH=50), and therefore that the correction limit has been exceeded, an alarm is output so the driver of the vehicle can be made to appropriately recognize the reliability of the image processing.

In the aforementioned embodiment, the luminance of the infrared image was corrected in the operation state of the surroundings monitoring processing as shown in step S05 to step S07, but it is not limited thereto. As in a modification of the aforementioned embodiment shown in FIG. 6, the luminance of the infrared image may be maintained without correction in the state of the correction limit not being exceeded in the operation state of the surroundings monitoring processing.

Figure 6:
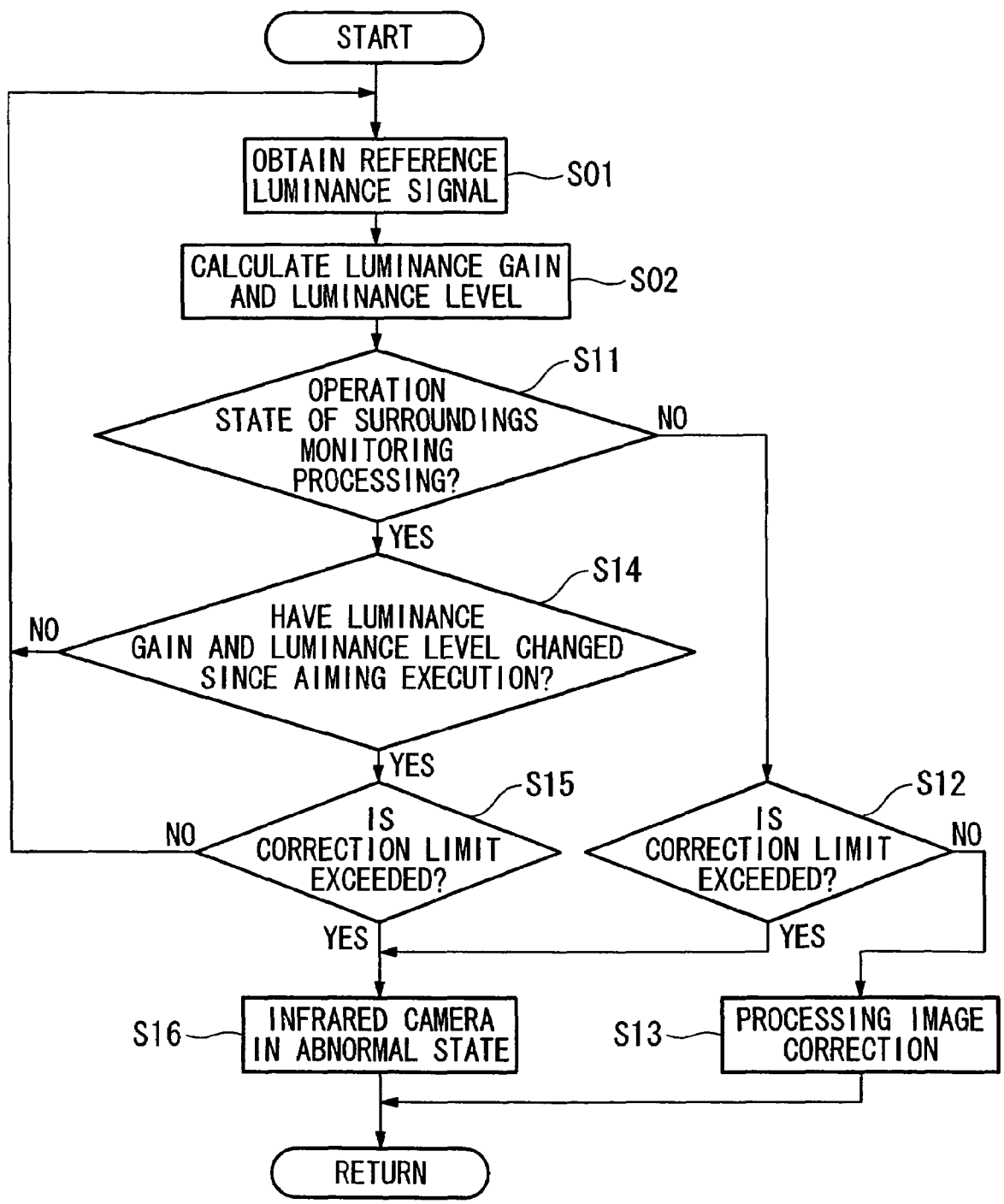
FIG. 6 is a flowchart showing a modification of the process shown in FIG. 5.

That is, in this modification, first, in step S01 shown in FIG. 6, an infrared image and a predetermined reference luminance signal are obtained from the infrared camera 2R and 2L.

Next, in step S02, the luminance gain R_GAIN and L_GAIN and luminance level R_LEVEL and L_LEVEL are set by the method of least squares etc. in the evaluation formula for each infrared camera 2R and 2L shown in the numerical expression (1) above so that a luminance MASK (J) of each pattern becomes equal to a predetermined luminance property KID (J).

Next, in step S11, it is determined whether or not it is in the operation state of the surroundings monitoring processing based on the infrared image output from the infrared camera 2R and 2L.

When the determination result is "YES", the flow proceeds to step S14.

On the other hand, when the determination result is "NO", that is, in the event of a non-operation state of the surroundings monitoring processing and during execution of aiming that adjusts the processing content of the image processing, the flow proceeds to step S12.

In step S12, it is determined for example whether or not either one of the evaluation values Err_R and Err_L shown in numerical expression (1) above is not less than a predetermined threshold value Err_TH (for example, Err_TH=50), and therefore that the correction limit has been exceeded.

When the determination result is "YES", the flow proceeds to step S16 that is described later.

On the other hand, when the determination result is "NO", the flow proceeds to step S13.

In step S13, in accordance with the set luminance gain R_GAIN, L_GAIN and luminance level R_LEVEL, L_LEVEL, the luminance of the infrared image (right and left image input luminance) stored in the image memory 21 is corrected (changed to the right and left process image luminance) for example by the numerical expression (2) above, and the processing is terminated.

In step S14, it is determined whether or not the luminance gain R_GAIN, L_GAIN and luminance level R_LEVEL, L_LEVEL have changed from the values during aiming.

When this determination result is "NO", the flow returns to the aforementioned step S01.

On the other hand, when the determination result is "YES", the flow proceeds to step S15.

In step S15, it is determined whether or not either one of the evaluation values Err_R and Err_L shown for example in numerical expression (1) above is not less than a predetermined threshold value Err_TH (for example, Err_TH=50), and therefore that the correction limit has been exceeded.

When the determination result is "YES", the flow proceeds to step S16, and in step S16, it is determined that the corresponding infrared camera 2R, 2L is in an abnormal state, and the processing is terminated.

On the other hand, when the determination result is "NO", the flow returns to the aforementioned step S01.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image processing apparatus comprising:
    an imaging device;
    a reference luminance property storage device that stores a predetermined reference luminance property;
    a luminance property calculating device that calculates a luminance property of the imaging device from an image obtained by the imaging device;
    a comparing device that compares the reference luminance property stored in the reference luminance property storage device and the luminance property calculated by the luminance property calculating device;
    a displacement determining device that determines whether or not the luminance property of the imaging device has relative displacement with respect to the reference luminance property based on a comparison result of the comparing device; and
    a luminance property correcting device that makes a correction of the luminance property of the imaging device,
    the luminance property correcting device is configured to correct the luminance property of the imaging device so as to become equivalent to the reference luminance property when the luminance property of the imaging device determined by the displacement determining device has relative displacement with respect to the reference luminance property.

2. The image processing apparatus according to claim 1, further comprising:
    a correction possibility determining device that determines whether or not it is possible to correct the luminance property of the imaging device by the luminance property correcting device based on a determination result by the displacement determining device; and
    an informing device that outputs an alarm when the correction is determined by the correction possibility determining device to be impossible.

3. The image processing apparatus according to claim 1, wherein the predetermined reference luminance property includes a gray scale bar disposed on the image obtained by the imaging device.

* * * * *